United States Patent [11] 3,628,006

[72] Inventors Samuel N. Sprunt;
John E. Murphy; Harry J. Saenger; Peter W. Higgins, all of Houston, Tex.
[21] Appl. No. 886,477
[22] Filed Dec. 19, 1969
[45] Patented Dec. 14, 1971
[73] Assignee Tideland Signal Corporation
Houston, Tex.

[54] SIGNAL LANTERN
6 Claims, 12 Drawing Figs.
[52] U.S. Cl. ............................................. 240/22, 240/41.55
[51] Int. Cl. ........................................... F21l 15/02
[50] Field of Search ............................ 240/22, 26, 106, 106.1, 41.55, 11.2; 116/107; 292/109; 9/8.3 E; 285/DIG. 16; 277/9, 9.5; 151/7; 85/32

[56] References Cited
UNITED STATES PATENTS

| | | | |
|---|---|---|---|
| 240,892 | 5/1881 | Courtenay | 85/DIG. 2 |
| 2,355,013 | 8/1944 | Rochestie | 9/8.3 |
| 2,481,531 | 9/1949 | Phillips | 240/41.55 |
| 2,765,481 | 10/1956 | Manhart et al. | 9/8.3 |
| 2,773,171 | 12/1956 | Pennow | 240/1.2 |
| 3,048,433 | 8/1962 | Doetsch | 287/127 |
| 3,119,430 | 1/1964 | Di Rico | 151/7 |
| 3,181,905 | 5/1965 | Bisbing | 292/109 |
| 3,187,177 | 6/1965 | Meyer | 240/106 |
| 3,194,956 | 7/1965 | Troccoli | 240/11.2 |
| 3,253,138 | 5/1966 | Nagel | 240/11.2 |
| 3,315,072 | 4/1967 | Harling | 240/25 |
| 3,443,085 | 5/1969 | Steltzer et al. | 240/10.66 |
| 3,456,103 | 7/1969 | Bond | 240/26 |
| 3,488,486 | 1/1970 | Bretthauer | 240/1.3 |

FOREIGN PATENTS

| 689,688 | 6/1964 | Canada | 240/17 |
|---|---|---|---|

Primary Examiner—Charles A. Ruehl
Assistant Examiner—John Whalen
Attorneys—James F. Weiler, Jefferson D. GIller, William A. Stout, Paul L. De Verter II, Dudley R. Dobie, Jr. and Henry W. Hope ABSTRACT: A weatherproof signal lantern having a lens for directing light therefrom and including a flange on the bottom and a base molded of fiberglass reinforced polyester resin plastic having a flange for sealably coacting with the lens flange. A plurality of plastic draw catches for securing the lens to the base and including additional bosses on the lens and base flanges whereby the lens and base are interchangeable with conventional type lantern lens and bases. The lens flange including a drip rail integral therewith extending downwardly and round the lens perimeter for limiting water entry into the interface between the lens and the base with an O-ring seal having a groove offset from the seal for bonding the O-ring from the side to prevent undue stress forces in the lantern. A plastic snap-in hinge which allows quick installation of a lens on a base.

Samuel N. Sprunt
John E. Murphy
Peter W. Higgins
Harry J. Saenger
INVENTORS

BY [signatures]

ATTORNEYS

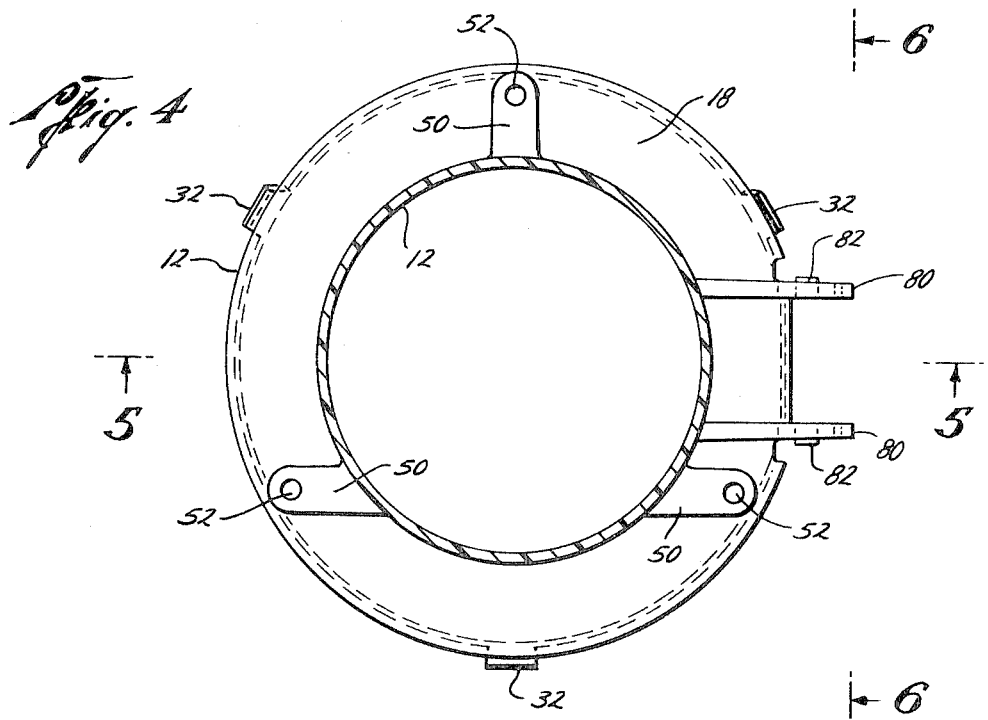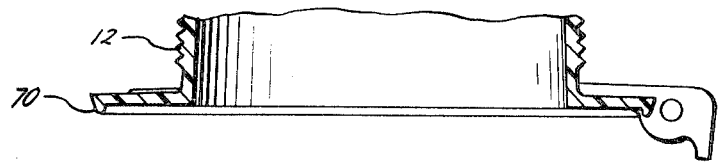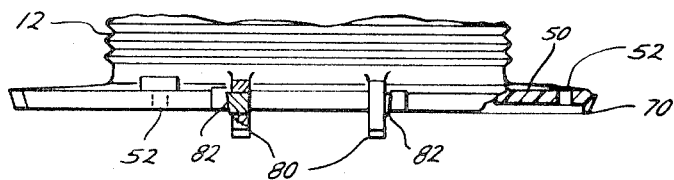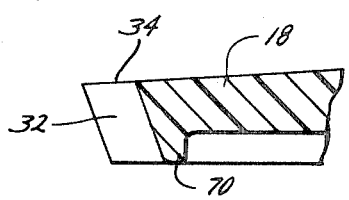

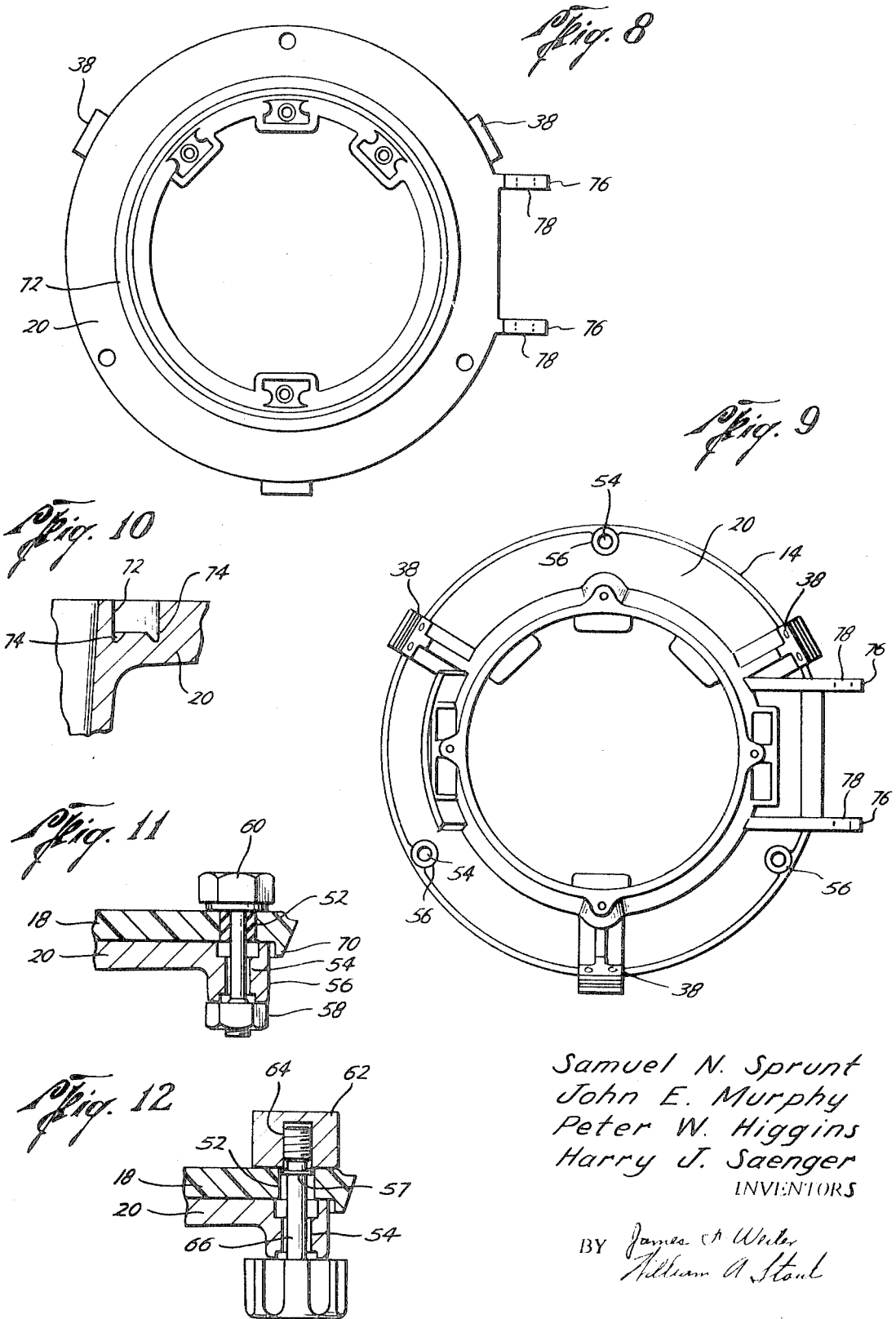

SIGNAL LANTERN

BACKGROUND OF THE INVENTION

Signal lanterns such as marine lanterns used on buoys, channel markers and other navigational aids are left unattended and are subjected to wind, waves, weather and extreme variations in temperatures and must be capable of withstanding these environmental conditions and operate without failure. A typical marine lantern is shown in U.S. Pat. No. 3,194,956 which utilizes a lens ring for clamping the lens to the lantern base.

The present invention is directed to various improvements in a signal lantern to increase its ability to withstand the environmental elements to which it is exposed and operate without failure and provide an increased life as well as ease of servicing.

SUMMARY

One feature of the present invention is the attachment of the lens to the lantern base without the use of a lens ring or metal hardware which is both difficult to operate on a moving buoy and is subject to rust and corrosion by providing a plurality of plastic draw catches in which the catch member is secured to a molded boss on the lantern base and the keeper member is integrally molded with the lens flange which provides a weatherproof fastening means as well as one which aligns the lens with the base.

Still a further object of the present invention is the additional provision of equally spaced bosses integral with the lens and positioned on top of the lens flange and bosses on the base flange, both adapted to support additional types of fastening means for attachment to conventional types of marine lantern bases and lens and also allows the use of additional fasteners to provide a secure and weathertight installation.

Still a further object of the present invention is the provision of a drip rail integral with the lens flange and extending downwardly from the outer edge of the lens flange around a substantial portion of the perimeter thereof for limiting water entry into the interface between the lens flange and the base flange.

Yet a further object of the present invention is the provision of a snap-in hinge providing a pivoting connection between the lantern and the base without using a metal hinge pin which would be subject to rusting and corrosion thereby providing quick installation or removal of a lens on the lantern base.

A further object of the present invention is the provision of a specially designed O-ring seal groove including a valley in the bottom of the groove spaced from the center thereof for receiving glue for bonding the O-ring from the side thereby preventing the addition of extra height to the O-ring causing a stress in the lantern.

Yet a further object of the present invention is the provision of a molded lantern base molded from a thermosetting polyester resin plastic reinforced with pieces such as particles or strands of fiberglass which withstands weathering and ultraviolet light and can sustain long term loading without deterioration and failure.

BRIEF DESCRIPTION OF THE DRAWINGS

FIG. 4 is a cross-sectional view taken along the line 4—4 of FIG. 1, FIG. 5 is a cross-sectional view taken along the line 5—5 of FIG. 4, FIG. 6 is a cross-sectional view taken along the line 6—6 of FIG. 4, FIG. 7 is an enlarged elevational fragmentary view of the edge of the flange of the lens, FIG. 8 is an elevational view of the top of the lantern base, FIG. 9 is an elevational view of the bottom of the lantern base, FIG. 10 is an enlarged fragmentary cross-sectional elevational view showing the shape of the O-ring groove in the base flange, FIG. 11 is an enlarged fragmentary cross-sectional view illustrating an alternate method of fastening the lens to the base, and FIG. 12 is an enlarged fragmentary cross-sectional view of still another type of fastening means for securing the lens to the lantern base.

DESCRIPTION OF THE PREFERRED EMBODIMENT

Figures 1, 2, 3:
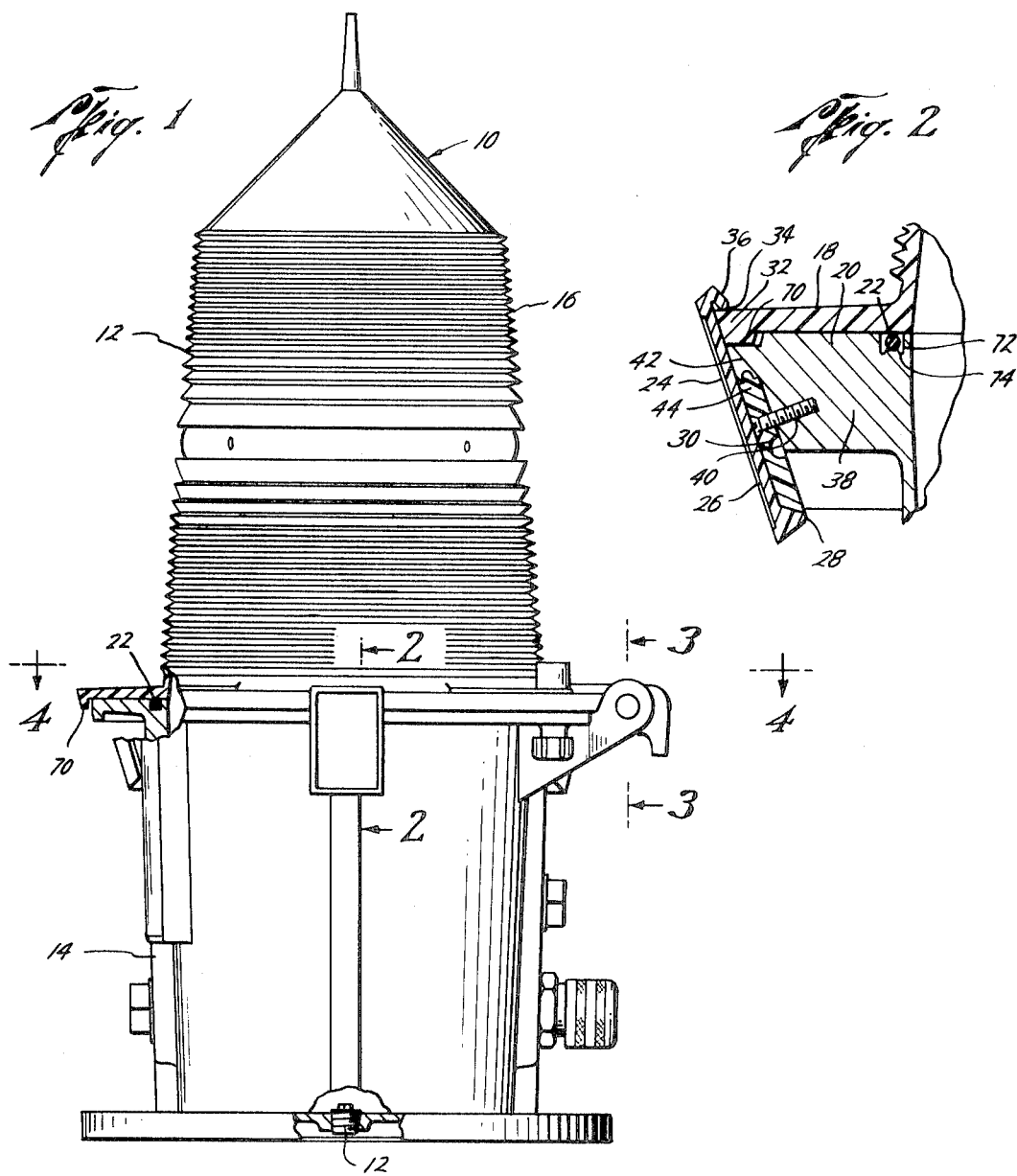
FIG. 1 is an elevational view of the marine lantern of the present invention.
FIG. 2 is an enlarged fragmentary cross-sectional view taken along the line 2—2 of FIG. 1.
FIG. 3 is an enlarged elevational fragmentary cross-sectional view taken along the line 3—3 of FIG. 1.

Referring now to FIG. 1, the reference numeral 10 generally indicates a signal lantern such as a marine lantern used to mark buoys, navigational structures, and obstructions and generally includes a lens 12 and a base 14.

As is conventional, the lens includes a suitable configuration for directing light therefrom from a lamp (not shown) in a horizontal plane and may be of any suitable material such as acrylic plastic having a plurality of lens elements 16 on the outer surface for suitably directing light therefrom.

The lens 12 includes a lens flange 18 which coacts with a flange 20 on the base 14, generally with an O-ring 22 (FIGS. 1 and 2) therebetween to provide a seal.

Conventionally, the lens 12 is fastened to the base 14 by a lens ring and metal hardware, such as shown in U.S. Pat. No. 3,194,956 which is subject to water accumulation and rusting problems. One of the features of the present invention is the attachment of the lens 12 to the base 14 without the use of a lens ring or without requiring the operation of metal hardware by providing a plurality of plastic draw catches generally indicated by the reference numeral 24 (FIGS. 1 and 2). A draw catch 24 generally includes a plastic catch member 26 which includes flexible pivots 28 and 30 and includes a keeper 32, all as generally shown in U.S. Pat. No. 3,181,905. However, the keeper member 32 is molded integral with the lens flange 18 at a plurality of locations, preferably 120° apart as shown in FIG. 4 and includes a keeper ledge 34 (FIGS. 2 and 7) to engage and hold the catch hook 36, preferably engaging the plastic catch member 26 at an angle to provide a better grip. That is the plane of the lens flange intersects the plane of the plastic catch member 26 at an angle less than 90° so that the catch hook 36 of the plastic catch member 26 engages the keeper ledge 34 and they lock together. A plurality of bosses 38 are molded to the base flange 20 also at a plurality of locations around the base flange 20 such as 120°, as best seen in FIGS. 8 and 9, and to which the catch member 24 is secured by means of screws 40. However, it is to be noted that the screws 40 need only be inserted and operated a single time to hold the catch member 24 in place and that operation of the draw catch is then accomplished by movement of the plastic catch member 24 about the pivot points 28 and 30 to engage or disengage the flange 36 on the ledge 34 of the keeper 32 whereby the draw catch can be opened and closed with a single motion and is not subject to corrosion and allows the catch to be opened rapidly and simply which is important to a service man standing on a moving buoy.

In addition, with the catch 24 in the closed position there is no water drainage and freezing problems such as can occur with a lens ring. Furthermore, the coaction of the catch member 26 and the keeper member 32 automatically aligns the base 14. The boss 38 may further include a support member 42 positioned between and abutting the base 44 of the catch member 26 and the keeper member 32 to provide a sturdy support.

However, in order to insure that both the improved lens 12 and the improved base 14 are interchangeable with existing lens and bases and/or to provide greater sealing between the lens 12 and the base 14, additional fastening means are provided in both the lens flange 18 and the base flange 20 for coacting with conventional fastening equipment. Thus as best seen in FIGS. 4 and 6, a plurality of raised bosses 50 are provided at 120° intervals and offset from the catches 32 to provide a support structure for conventional or other additional desired fastening means and a hole 52 is provided in the lens flange 18 to provide an aligning reference for the fastening devices that may be used. But it is noted that if the alternative or additional fastening means are not used the holes 52 may be omitted or suitably plugged such as by elastic rubber. And if the lens is later used on conventional bases, the rubber compound acts as a visible marker and a workman need only extend the holes 52 through the lens flange 18 by drilling a coaxial hole through the rubber compound for passage of suitable fasteners.

Referring to FIGS. 8 and 9, the base flange 20 similarly includes a plurality of bosses 56 having openings 54 spaced to be aligned with the holes 52 of the lens flange 18 for accommodating suitable fastening means.

Thus, as best seen in FIG. 11, the flange 18 of the improved lens 12 may be connected to the flange 20 of base 14 of the present invention or the present base 14 may receive a conventional lens and lens ring by the use of a standard thumb screw 60 and nut 58 or the improved lens 12 may even be connected to a conventional base (not shown) by aligning the holes 52 with the standard fasteners used in the conventional base.

However, a more preferred method of attaching the improved lens 12 or attaching a conventional lens to the improved base 14 is shown in FIG. 12 wherein the fastening hardware comes in from the bottom reducing possible damage to the lens 12 caused by wrenches or screwdrivers. Thus, a special cap, such as an acrylic nut 62, having a threaded interior 64 is bonded to the lens flange 18 (or lens ring) in alignment with hole 52 and the opening 54 whereby a suitable plastic screw 66 may be inserted from the bottom and screws into nut 62 and which also provides a more waterproof fastener. A captivating ring 57 is connected to screw 66 to prevent loss of the screw 66. Furthermore, the mechanical loads established by the attachment of the fasteners 66 is distributed by the cap 62 over a broad surface area of the top of the lens flange 18.

Referring now to FIGS. 1, 2, 5, 6, 7, 11 and 12, it is noted that a drip rail 70 is integrally molded with the lens 12 at the outer perimeter of the lens flange 18 and extends downwardly and nearly continuously, except for the immediate locality of the hinge, around the lens flange 18 to limit water penetration into the interface between the lens flange 18 and the upper base flange 20. This feature will keep the interior of the lens dry preventing electrical problems with the lantern by preventing wave- and wind-driven water reaching the interior of the lantern. And in colder climate, with prolonged periods of below freezing weather, the presence of water between the flange interface could cause lantern fracture due to water freezing.

While a plastic hinge pin may be provided, another feature of the present invention is the provision of snap hinges for supporting the lens 12 from the base 14 without the use of metal pins and bolts which would be subjected to corrosion and rust. Thus, referring to FIGS. 3, 8 and 9, the base 14 includes a set of hinges 76 having the conventional openings 78 therein. Referring also to FIGS. 3, 4 and 6, the lens 12 includes a set of hinges 80 which includes pins 82 integral therewith for insertion into the openings 78 of the base hinges 76. While this can be done by squeezing the lens hinges 80 together for inserting the pins 82 into the openings 78, it is preferable to taper the outer faces 84 of the pins 82 50 that they more easily may be wedged into and inserted into the openings 78. This feature allows a service technician to install and remove a new lens on a lantern base quickly and simply even after it has been in service a long period of time.

Another feature of the present invention is making the base 14 from a fiberglass reinforced polyester resin plastic. It has been found that this is a thermosetting plastic having properties along with the reinforcing of pieces of fiberglass such as chopped fiberglass or strands of fiberglass which makes the resulting material much more resistant to long term stress than conventionally used thermoplastics. It has been found that such a material permits long term loading, as compared to other plastic materials, and is not subject to undue ultraviolet deterioration, and stress creep. This material can sustain long term loadings of about 8,000 to 10,000 p.s.i. and will retain a greater part of this strength for a longer period of time than conventionally used materials.

In use, the lens 12 may be attached to the base 14 without the use of any lens ring which could possibly cause water damage or without the use of metal fasteners by using the polypropylene draw catches 24 which may be hand operated to secure or release the lens 12 from the base 14. However, either the lens 12 or the base 14 may be used with conventional lens and bases by the alternative or additional methods of attachment of the lens to the base by the provision for the bosses 50 (FIGS. 4 and 6) wherein the holes 52 are aligned with openings 54 in the bosses 56 in the flange 20 of the base 14. Thus, the workman need only insert a conventional fastener through the holes 52 for securing the lens 12 to a conventional base. Similarly, the flange 20 of the base 14 will readily receive a conventional lens and lens ring as desired. Furthermore, additional fastening methods may be provided, such as shown in FIG. 12, wherein a nut 62 is bonded to the top of the lens flange 18 or to a lens ring and may include plastic threads 64 whereby a fastener 66 may be inserted up through the underside of the base flange 20 through the opening 54 and recess 52 in the lens flange 18 and into the thread nut 62. Additionally, the lens 14 includes a drip rail 70 which protects the interface between the lens flange 18 and the base flange 20 from wind- or wave-driven water.

And as shown in FIG. 3, the pins 82 in the hinges 80 on the lens 12 allow quick insertion and removal of the lens from the base 14 while still providing a hinge connection, and as shown in FIG. 10, the O-ring groove 72 has been provided with one or more valleys 74 to prevent the agent bonding the O-ring in the groove from adding thickness to the groove and increasing the clamping force required to seal the lantern. And the particular plastic formulation of the fiberglass reinforced polyester plastic has excellent corrosion and weather resistance and resists undue ultraviolet deterioration and its strength is not degraded with time when subjected to prolonged stresses and weathering.

The present invention, therefore, is well adapted to carry out the objects and attain the ends and advantages mentioned as well as others inherent therein.

What is claimed is:

1. A signal lantern comprising: a lens for directing light therefrom and including a lens flange at the bottom thereof; a base for supporting said lens and having a base flange for sealably coacting with the lens flange; a plurality of draw catches for securing said lens to said base, said catches including a plastic catch member having a catch hook and being connected to said base, and keeper members on said lens flange, said keeper members being integral with the lens flange and spaced about the circumference thereof, the top of the keeper members forming a keeper ledge which is generally flat and aligned with the top of the lens flange; and a plurality of boss members on said base for securing said plastic catch members to said base, the surface of said boss to which the plastic catch members are secured making an angle of less then 90° with the top of the keeper ledge thereby providing a gripping angle for said plastic catch hook.

2. The apparatus of claim 1 including,
   coacting sets of hinge arms, one set integral with the lens and one set integral with the said base whereby the lens may be opened without being released from the base.

3. The apparatus of claim 2 including,
   one set of hinge arms including openings therein, and
   the other set of hinge arms including pins therein and adapted to be inserted in the openings, said pins including a tapered face at the outer ends for ease of insertion into the openings.

4. The apparatus of claim 1 including, a plurality of equally spaced bosses integral with the lens,
said bosses each including a vertical recess extending through the flange of the lens,
a plastic-threaded nut bonded on each of said bosses above and aligned with said vertical recess for receiving a fastener,
a fastener extending upwardly through the base flange and recess and into the threaded nut for fastening the lens to the base.

5. The apparatus of claim 1 including, an annular groove in the base adjacent the lens flange for receiving an O-ring seal, said groove including a valley in the bottom of the groove spaced from the center of the groove whereby when the groove receives glue for bonding the O-ring any excess glue will flow to the valley preventing adding height to the O-ring by the glue.

6. A marine signal lantern comprising: an acrylic lens for directing light therefrom and including a lens flange on the bottom thereof; a base for supporting said lens and having a base flange for sealably coacting with the lens flange; a plurality of draw catches for securing said lens to said base, said catches including a plastic catch member having a catch hook and being connected to said base, and keeper members on said lens flange, said keeper members being integral with the lens flange and spaced about the circumference thereof, the top of the keeper member forming a keeper ledge which is generally flat and aligned with the top of the lens flange; a plurality of boss members on said base for securing said plastic catch members to said base, the surface of said boss to which said plastic catch members are secured making an angle of less than 90° with the top of the keeper ledge thereby providing a gripping angle for said plastic catch hook; and coacting sets of hinge arms, one set integral with the lens and one set integral with the base whereby the lens may be opened without being disconnected from the base, said base being molded from thermosetting polyester resin plastic reinforced with fiberglass and said lens including a drip rail integral therewith and extending downwardly from the outer edge of the lens flange and extending around a substantial portion of the perimeter of the lens flange for limiting water entry into the interface between the lens flange.

* * * * *